April 5, 1966 M. H. WENNING 3,244,271
AUGER FOR AXIALLY MOVING AND LATERALLY DISCHARGING MATERIAL
Filed Oct. 26, 1964 2 Sheets-Sheet 1
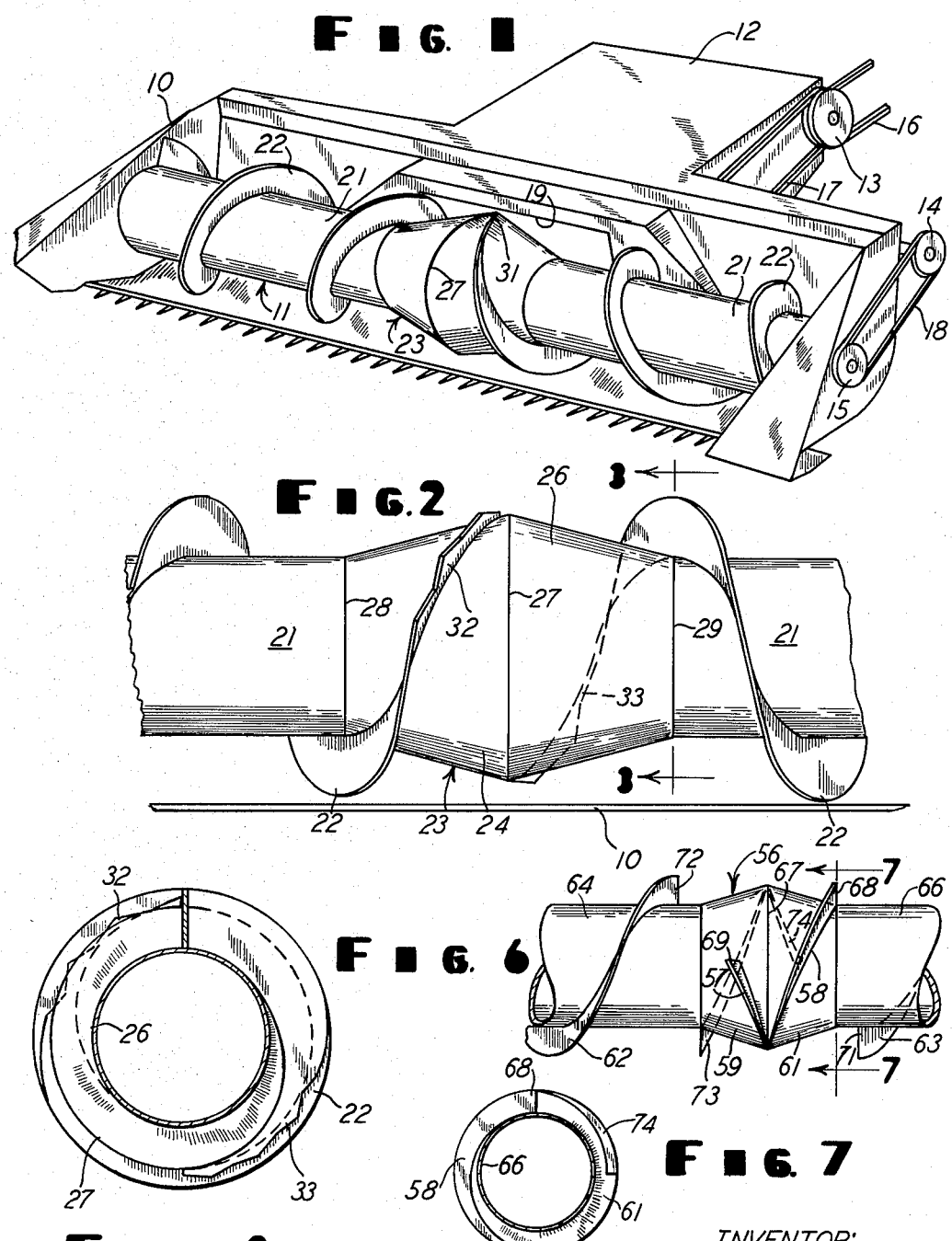
INVENTOR:
MAURICE H. WENNING
BY: *[signature]*
ATTORNEY

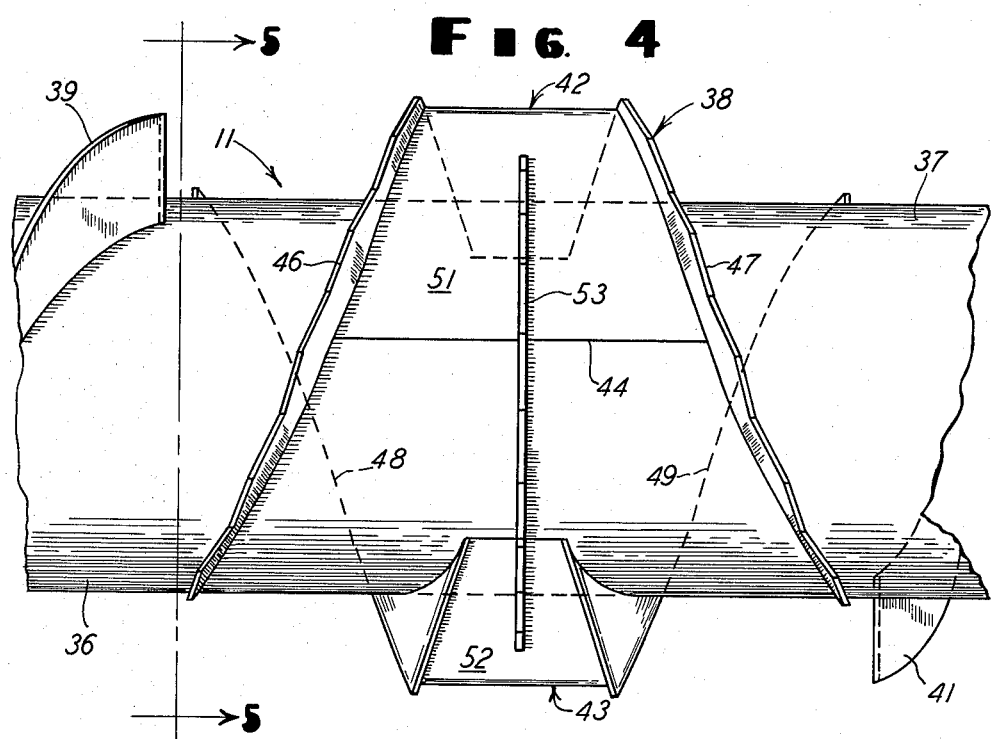
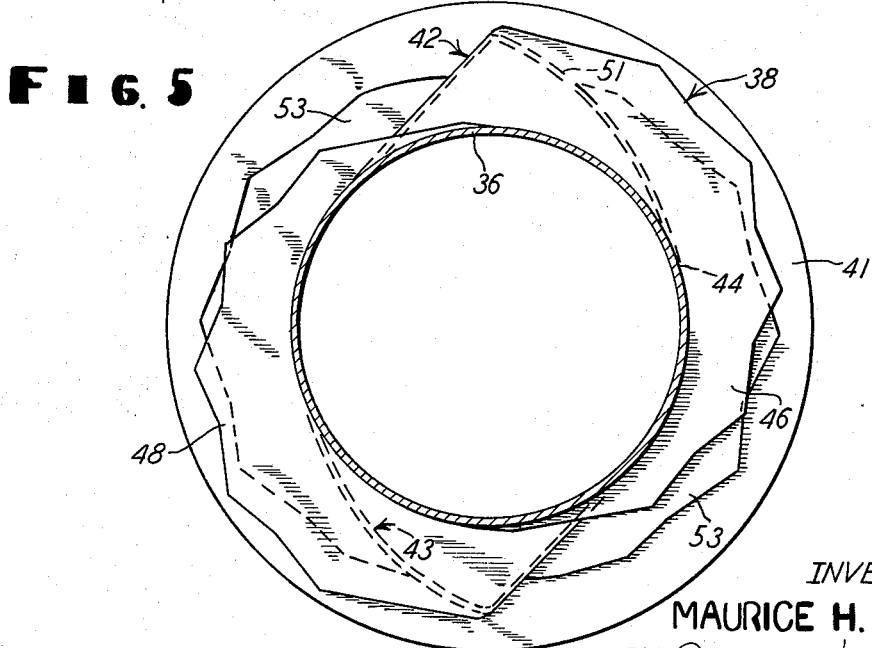

3,244,271
AUGER FOR AXIALLY MOVING AND LATERALLY DISCHARGING MATERIAL

Maurice H. Wenning, Moline, Ill., assignor to J. I. Case Company, Racine, Wis., a corporation of Wisconsin
Filed Oct. 26, 1964, Ser. No. 406,347
7 Claims. (Cl. 198—217)

This invention relates to an auger for moving material, and more particularly, it relates to an auger which is useful on an agricultural harvesting machine for moving crops along the pickup trough of the machine's header and into the crop processing portions.

This invention has particular application in agricultural harvesting machines, and accordingly it will be described in that art, although it will be apparent that the invention could be utilized in other machines and arts. Harvester augers are comonly known to have retractable rods or fingers in the central portions of the augers where the crops are moved into the discharge opening in the header trough. These fingers of course operate to engage and urge the crops in a direction transverse to the axis of the auger, as desired. However the fingers are expensive to manufacture and mount in the auger, and they frequently become a maintenance problem because they must retract once in every revolution of the auger. Retractable plates have also been employed, and other means have been attempted in an effort to overcome the problem of moving the material transverse to the axis of the auger.

It is a general object of this invention to provide an improved auger which will effectively move material transverse to the axis of the auger at the desired point of dicharge from the auger.

A more specific object of this invention is to provide an auger which employs means for moving material transverse to the axis of rotation of the auger and with the means being a non-movable type so that no moving parts are required, and thus there is simplification in both the manufacture and maintenance of the auger as well as in the operation of the auger of the type where movable means are employed.

Still another more specific object of this invention is to provide an auger with a means which is more agressive and efficient than those heretofore known in the operation of moving the material handled by the auger in the direction transverse to the axis of rotation of the auger.

FIG. 1 is a front perspective view of a portion of a harvesting machine header having an auger provided with a preferred embodiment of this invention.

FIG. 2 is an enlarged front elevational view of a fragment of an auger mountable in the header shown in FIG. 1 but having a slightly modified arrangement of the auger.

FIG. 3 is a sectional view taken on the line 3—3 of FIG. 2.

FIGS. 4 and 6 are front elevational views of fragments of augers showing other modifications thereof.

FIG. 5 is a sectional view taken on the line 5—5 of FIG. 4.

FIG. 7 is a sectional view taken on the line 7—7 of FIG. 6.

FIG. 1 shows a combine header part in that it shows the pickup trough 10 with an auger generally designated 11 rotatably mounted in the trough 10. A conveyor housing 12 is shown integral with the trough 10 and is rearwardly thereof. Pulleys 13, 14, and 15, and belts 16, 17, and 18 show how the drive may come from the prime mover of the harvester (not shown) so that the auger 11 is of course rotatable in the well-known manner. Also, in the well-known manner, a discharge opening 19 is provided in the trough 10 so that crops which are engaged by the auger 11 will be moved to the discharge opening 19 and into the conveyor housing 12 and on into the harvester.

The auger 11 is shown to consist of a cylindrical base member 21 and the spiraled flights or material-moving means 22 which are of course suitably attached to the base member 21. A base member 21 is located on each end of the auger 11, along with the spiraled flights 22, and the latter are oppositely wound, such that rotation of the auger 11 in the one direction required will move the crop or material to the center of the auger 11 adjacent the discharge opening 19 in the well-known manner.

The auger 11 also is shown to include a central portion generally designated 23, and this portion is connected to each inward end of the base members 21 which are of course cylindrical and coaxial so that the center portion 23 is coaxial with the members 21 and is rotatable therewith. FIGS. 1, 2, and 3 show an embodiment of the auger wherein the central portion 23 is comprised of two oppositely disposed truncated cone portions 24 and 26 having a common base along the line designated 27. Of course the cone portions 24 and 26 are connected to the respectively adjacent base members 21 along the lines designated 28 and 29, and these connections may be by welding or any other suitable manner.

Thus, FIGS. 1, 2, and 3 show an auger with base members 21 and with base members 24 and 26 connected to the base members 21 but with the base members 24 and 26 having a radial extent larger than the radial extent of the base members 21. The enlargement provides for the transverse movement of material handled by the auger since the volume between the auger base members 24 and 26 and the auger trough 10 is decreased toward the center line 27 of the auger. Thus the material is forced in the transverse direction with respect to the auger axis and is forced into the discharge opening 19.

The FIG. 1 embodiment shows that the auger flight 22 extends continuously over the base portions 21 and 24 and 26, and the flights terminate at ends, such as the end designated 31, on diametrically opposite sides of the base members.

FIG. 2 shows the same construction of the auger base members, however the auger flights are arranged with serrated sections or ends 32 and 33 so that the material may be better engaged by the flight ends 32 and 33 and thus be better controlled and conveyed. In both the embodiments of FIG. 1 and FIG. 2, the radial extent which is the outer diameter of the flight 22 of the auger 11 is greater on the flights 22 than it is on the base line 27 of the base members 24 and 26 shown in FIG. 3. This relationship therefore permits the material to come within the grasp of the intermediate portion 23 as the latter will not prevent and resist the material from coming into engagement with the portion 23 even though the oppositely disposed cone sections 24 and 26 arc employed.

FIGS. 4 and 5 show still another embodiment of the invention, and here it will be noted that the conveyor is provided with base members 36 and 37 on each side of the enlarged central member 38. The base members of portions 36 and 37 have the flights 39 and 41 connected thereto and leading into the central portion 38 as shown. The central portion 38 in this instance is shown to be comprised of two diametrically opposite inclines or ramps 42 and 43 which are radially extended beyond the base members 36 and 37 for the transverse movement of the material as described in connection with the other embodiments. In this instance, the ramp portion 42, for instance, is shown connected to the base member which may be the one cylinder shown and extending through the length of the auger. The connection may be along the line designated 44, and it may of course be that the ramp portion 42 and the base cylinder are welded along the line 44.

The central portion 38 also includes the serrated flights 46 and 47 connected with the ramp portion 42 and the flights 46 and 47 are also suitably connected to the base cylinders 36 and 37 by welding or the like. In this instance, the flights 39 and 41 and the flights 46 and 47, along with the flights 48 and 49 of the ramp portion 43, are shown to be discontinuous rather than continuous as shown in the previous embodiments. Of course it will also be noted that the ramp portions 42 and 43 extend radially outwardly from the base cylinders 36 and 37 in their respective base surfaces 51 and 52.

FIGS. 4 and 5 also show a member 53 which is suitably attached to the base cylinders 36 and 37 and also to the central portions 42 and 43 and extends therefrom. The member 53 is shown to be a plate member with serrations on the radially extending end for engagement of material being handled and for the aggressive and positive movement of the material into the discharge opening 19. A plate 53 is shown on each diametrically opposite side of the auger shown in FIGS. 4 and 5.

As mentioned, in FIGS. 4 and 5, the base members 36 and 37 may be portions of one cylindrical member as shown. Also, the intermediate portion 23 of FIGS. 1 and 2 may be considered an enlargement or ramp which extends radially outwardly as compared to the radial extent of the base members 21.

FIGS. 6 and 7 show another embodiment which is useful where it is desirable to spread the material without having it tend to crowd to the center of the auger. Where the auger is used on windrow crops, and the central portions 42 and 43 are directed at the windrow, it is desirable to spread the crops to where they uniformly enter the header opening 19. For this purpose, the auger 56 of FIGS. 6 and 7 has flights 57 and 58 in a reverse direction on base members 59 and 61 compared to the direction of material feed by the flights 62 and 63 on base members 64 and 66. Thus, flights 62 and 63 bring material toward the base members 59 and 61, while flights 57 and 58 urge the material away from the base line 67 which is common to the two cones shown to form the base members 59 and 61.

Flight 58 extends around one-half of the base member 61, and it has an end 68 projecting outwardly from base member 61. Flight 57 extends around one-quarter of the base member 59, and it has an end 69 projecting outwardly from base member 59. In both arrangements, the ends 68 and 69 are axially and circumferentially spaced from the ends 71 and 72, respectively, of the flights 62 and 63. This arrangement provides spaces between the respective flight ends, which are therefore interrupted or discontinuous, for the accommodation of material.

Flights 57 and 58 are duplicated by flights 73 and 74 on the opposite sides of the base members 59 and 61.

While specific embodiments of this invention have been shown and described, it should be apparent that certain changes can be made in the embodiments and the invention should therefore be determined only by the scope of the appended claims.

What is claimed is:

1. An auger for use in a trough having a discharge opening therein, comprising two cylindrical end portions of a uniform diameter throughout their lengths and an intermediate portion disposed between said end portions and connected thereto and being continuous therebetween, all said portions being rotatably mounted and including base members and spiraled flights mounted on said base members for moving material axially of said end portions in response to rotation of said portions, the radial extent of said base member of said intermediate portion being gradually increasing with respect to the direction of material movement along the respective said end portion adjacent the closest end of said intermediate portion and being greater than the radial extent of said diameter of said base members of said end portions and with the greatest radial extent of said base member of said intermediate portion being less than the radial extent of any of said spiraled flights for moving said material into the discharge opening in the trough.

2. An auger for use in a trough having a discharge opening therein, comprising two cylindrical first portions of a uniform diameter throughout their lengths and a second portion disposed intermediate said first portions and connected thereto and being continuous therewith, said portions being rotatably mounted and both including base members and spiral flights mounted on said base members for moving material axially of said first portions in response to rotation of said portions, said base member of said second portion being of two co-axial base-to-base frusto-conical shapes and extending radially outwardly and beyond said diameter of said first portion from the respective contiguous ends of said base members of said first portions and to a diametrical extent less than any of said spiral flights for moving said material into the discharge opening in the trough, said spiral flights on said base member of said second portion being arranged opposite to that of said spiral flights on the respective said contiguous ends of said first portion for moving material in the axially opposite direction from that of said contiguous ends.

3. An auger comprising a cylindrical first portion of a uniform diameter throughout its length and a second portion disposed axially of said first portion and connected thereto and being continuous therewith, said portions being rotatably mounted and both including base members and spiraled flight means mounted on said base members for moving material axially of said first portion in response to rotation of said portions, said base member of said second portion being a ramp extending radially outwardly beyond said diameter of said base member of said first portion for moving said material transverse to the axis of rotation, said flight means on said ramp being spiraled thereon in the direction opposite to that of said flight means on said first portion.

4. An auger for use in a trough having a discharge opening therein, comprising two cylindrical first portions of uniform diameter throughout their lengths and a second portion disposed intermediate said first portions and connected thereto and being continuous therewith, all said portions being rotatably mounted and including base members and spiraled flights mounted on said base members for moving material axially of said first portions in response to rotation of said portions, said base member of said second portion being of two co-axial base-to-base frusto-conical shapes and extending radially outwardly and beyond said diameter of both of said base members of said first portions for moving said material into the discharge opening in the trough, and the common base of said conical shapes being of a diameter less than the outer diameter of any portion of said spiraled flights.

5. Material-moving apparatus comprising an auger, a trough having a discharge opening and being open for the entry of material and being planar in the extent across its bottom, said auger including two cylindrical end portions and an intermediate portion disposed between said end portions and connected thereto and being continuous therebetween, all said portions being rotatably mounted and including base members and spiraled flights mounted on all said base members and radially extending to a position of slight clearance along said bottom of said trough for moving material axially of said auger in response to rotation of said auger, the radial extent of said base member of said intermediate portion being gradually increasing and being greater than the radial extent of said base member of said end portions and less than the radial extent of any of said spiraled flights for moving said material into the discharge opening in the trough, and said flights being spirally disposed on said base member of said intermediate portion in opposite directions from said flights on said end portions respectively adjacent said intermediate portion for moving said material in axially opposite directions upon rotation of said portions in one direction.

6. An auger for use in a trough having a discharge opening therein, comprising two cylindrical first portions, each being of uniform diameter throughout their lengths, and a second portion disposed intermediate said first portions and connected thereto and being continuous therewith, all said portions being rotatably mounted and each including a base member and flights mounted on all said base members for moving material axially of said first portions in response to rotation of all said portions, said base member of said second portion being of two base-to-base frusto-conical shapes and extending radially outwardly from said uniform diameters of both said base members of said first portions for moving said material into the discharge opening in the trough, and said flights on said base member of said second portion being spirally disposed in the direction opposite to that of the respective said flights on said base members of said first portions for respectively moving said material in axially opposite directions upon rotation of all said portions in one direction.

7. A screw type of auger conveyor comprising a rotatable cylindrical member including two end portions of a uniform diameter throughout their lengths and having first spiraled flights for the movement of material axially toward the central portion of said member upon rotation of said auger in one direction, the central portion of said member being radially enlarged with respect to said end portions for engagement and urging of material radially outwardly with respect to the axis of said member, and second spiraled flights extending on said central portion and spiraled in the direction opposite to that of said first spiraled flights at the respective end contiguous to said end portions for moving material axially away from said central portion of said member upon rotation in said one direction.

References Cited by the Examiner

UNITED STATES PATENTS 2,978,097  4/1961  Blanshine _____ 198—217
3,022,882  2/1962  West _____ 198—9

FOREIGN PATENTS 652,560  11/1962  Canada.

OTHER REFERENCES

German printed application, 1,073,392, January 1960.

EVON C. BLUNK, *Primary Examiner.*

RICHARD E. AEGERTER, *Examiner.*